(12) United States Patent
Consales et al.

(10) Patent No.: US 8,455,380 B2
(45) Date of Patent: Jun. 4, 2013

(54) SELF-LEVELLING CONCRETE

(75) Inventors: Thierry Consales, Pernes les fontaines (FR); Michel Gaubil, Les Angles (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 0 days.

(21) Appl. No.: 13/126,323

(22) PCT Filed: Oct. 26, 2009

(86) PCT No.: PCT/IB2009/054719
§ 371 (c)(1),
(2), (4) Date: May 26, 2011

(87) PCT Pub. No.: WO2010/049872
PCT Pub. Date: May 6, 2010

(65) Prior Publication Data
US 2011/0219987 A1    Sep. 15, 2011

(30) Foreign Application Priority Data
Oct. 29, 2008  (FR) ..................... 08 57370

(51) Int. Cl.
*C04B 35/48* (2006.01)
*C04B 35/49* (2006.01)
*C04B 35/14* (2006.01)
*C04B 35/16* (2006.01)
*C04B 7/00* (2006.01)
*C04B 16/00* (2006.01)
*C04B 24/00* (2006.01)
*C04B 24/10* (2006.01)
*C03B 5/00* (2006.01)
*C03B 11/08* (2006.01)

(52) U.S. Cl.
USPC ........... 501/105; 106/802; 501/102; 501/103; 501/133; 65/347; 65/374.13

(58) Field of Classification Search
USPC .............. 65/347, 374.13; 501/102, 133, 103, 501/105; 106/802
See application file for complete search history.

(56) References Cited

U.S. PATENT DOCUMENTS

| | | | |
|---|---|---|---|
| 4,308,067 A | 12/1981 | Guigonis et al. | |
| 7,074,733 B2 * | 7/2006 | Guigonis et al. | 501/95.1 |
| 2004/0138048 A1 | 7/2004 | Anderson | |
| 2004/0266604 A1 * | 12/2004 | Guigonis et al. | 501/105 |

FOREIGN PATENT DOCUMENTS

| | | |
|---|---|---|
| FR | 2 458 520 A1 | 1/1981 |
| FR | 2 832 403 A1 | 5/2003 |
| FR | 2 914 300 A1 | 10/2008 |

OTHER PUBLICATIONS

"Cement and Concrete Basics". Dec. 28, 2003 [Retrieved May 7, 2012]. Retrieved from http://web.archive.org/web/20031228041510/http://www.cement.org/basics/concretebasics_history.asp.*
Nov. 26, 2009 International Search Report issued in International Patent Application No. PCT/IB2009/054719 (with translation).

* cited by examiner

*Primary Examiner* — Kaj K Olsen
*Assistant Examiner* — Karam Hijji
(74) *Attorney, Agent, or Firm* — Oliff & Berridge, PLC

(57) ABSTRACT

A powder including, in percentages by weight: (a) 94% to 99% of particles of at least one refractory material, the main constituent(s) of which are alumina and/or zirconia and/or silica; (b) 1% to 6% of a hydraulic cement; (c) 0 to 0.03% of organic fibers; (d) optionally, 0.075% to 1% of a surfactant; and (e) optionally, a setting accelerator, where the fraction of particles having a size below 40 μm being distributed, in percentages by weight relative to the weight of the powder, in the following manner: (1) fraction<0.5 μm: $\geq$4%, (2) fraction<2 μm: $\geq$5%, fraction<10 μm: $\geq$16%, and fraction<40 μm: 29-45%, where the proportion of zirconia in the fraction of particles having a size smaller than 10 μm, called "fines", is between 35% and 75% by weight relative to the total weight of said fraction.

26 Claims, No Drawings

SELF-LEVELLING CONCRETE

TECHNICAL FIELD

The present invention relates to a powder intended in particular for the production of floors of a glass furnace. The invention also relates to a process for manufacturing a cured concrete from this powder.

PRIOR ART

The glass industry generally uses for the construction of its furnaces refractory substances that are fused-cast or obtained by sintering, these being highly resistant to corrosion by the glass and taking the form of blocks or slabs.

Glass infiltration between the slabs of glass furnace floors causes corrosion of the materials used to form the layer beneath the slabs, which is called a "screed", and then the corrosion of the slabs themselves. To limit the infiltration of molten glass between the slabs, a fresh concrete may be poured in order to grout these slabs.

Patent FR-B-2 458 520 describes a powder intended for manufacturing such concrete. This powder, based on particles of a fused-cast refractory material containing a glassy matrix, is widely used. The fresh concrete obtained has however the drawback of not being pumpable using pumps producing suction pressures of 180 bar or less.

Fresh pumpable refractory concretes used for grouting the blocks of metal smelting furnaces are known. The constraints on this application are however very different from those encountered in glass furnace applications. The conditions under which furnaces corrode by a glass and by a molten metal are also different. Certain impurities, tolerated in metal smelting furnaces, are unacceptable for glass manufacture. In particular, the refractory materials used in glass furnaces must not generate defects such as the release of stones by fragmentation of the refractory material into the molten glass bath or the production of bubbles. A refractory concrete intended for a metal smelting furnace cannot therefore be used a priori for a glass furnace.

FR 2 832 403 describes a fresh concrete that can be used in glass furnaces and can be easily pumped. This fresh concrete must be processed by pouring it or by means of a vibrating screed board, but FR 2 832 403 provides no information about the self-levelling character.

The manufacture of a cured concrete from the powder described and claimed in FR 2 832 403 conventionally requires activation by an addition of water, so as to constitute a fresh concrete, and then, after the fresh concrete has been poured, the application of vibration, generally using a vibrating screed board. This vibration operation may be lengthy.

This operation is also tricky and requires a particular know-how, since a vibration not carried out uniformly may result in segregation in the poured fresh concrete and, as a consequence, may lead to cracks during drying or during heat-up.

This problem is all the more critical when the poured fresh concrete covers a large area.

There is therefore a need for a powder that can be used in glass furnaces which is easier to implement.

There is also a need for an easily pumpable fresh concrete requiring no vibration operation in order to be laid and resulting in no segregation.

The present invention aims to meet these requirements, at least partially.

SUMMARY OF THE INVENTION

The invention provides a powder, intended particularly for the production of floors of a glass furnace, comprising, in percentages by weight;

(a) 94% to 99% of particles of at least one refractory material, the main constituent or constituents of which are alumina ($Al_2O_3$) and/or zirconia ($ZrO_2$) and/or silica ($SiO_2$);
(b) 1% to 6%, preferably 3%-5%, of a hydraulic cement;
(c) 0 to 0.03% of organic fibres;
(d) optionally, preferably 0.075% to 1%, and preferably 0.1% to 1%, of a surfactant; and
(e) optionally, a setting accelerator,
the fraction of particles having a size below 40 µm being distributed, in percentages by weight relative to the weight of the powder, in the following manner:
fraction<0.5 µm: $\geq$4%
fraction<2 µm: $\geq$5%, preferably $\geq$8%,
fraction<10 µm: $\geq$16%
fraction<40 µm: 29-45%, preferably $\geq$30-45%,
and the proportion of zirconia in the fraction of particles having a size smaller than 10 µm, called "fines", hereinafter being between 35% and 75% by weight relative to the total weight of said fraction.

As will be seen in greater detail in the rest of the description, a fresh concrete manufactured from such a powder, and provided that the surfactant is present in the fresh concrete, is:
pumpable with suction pressures of 180 bar or less;
"self-levelling", i.e. it can be laid without a vibration operation; and
does not result in any segregation.

The proportion of zirconia in the fines fraction may then be in particular greater than 40%, or greater than 45% or greater than 50% but less than 60%, or even less that 55% or less than 53%.

Preferably, the particles of the powder are distributed in the following manner, in percentages by weight:
fraction<0.5 µm: $\geq$5% but $\leq$6.5% and/or
fraction<2 µm: $\geq$8%, preferably $\geq$10%, and preferably $\geq$13% but $\leq$18% and/or
fraction<10 µm: $\geq$22%, preferably $\geq$24% but $\leq$35%, preferably $\leq$34% and/or
fraction<40 µm: $\geq$30% but $\leq$40%.

Preferably, the powder has the following composition by weight, for a total of more than 95%, preferably for a total of more than 97%:
$Al_2O_3$: 40%-65%
$ZrO_2$: 20%-45%
$SiO_2$: 8%-20%.
Preferably:
$Al_2O_3$: $\geq$45%, preferably $\geq$50% but $\leq$60% and/or
$ZrO_2$: $\geq$25%, preferably $\geq$30%, but $\leq$40%, or even $\leq$35% and/or
$SiO_2$: $\geq$12% but $\leq$15%.
Preferably, the fractions (a) and (b) of the powder together comprise, in percentages by weight:
an AZS particle content greater than 40%, or greater than 45% or greater than 50% or greater than 55% but less than 70%, or less than 65% or less than 60%; and/or
a "free" zirconia content, i.e. one not associated with another compound, such as for example in mullite, or in an AZS material, greater than 5%, or greater than 8% or greater than 10% or greater than 12% but less than 30%, or less than 25% or less than 20% or less than 18%; and/or
a total free alumina content, i.e. one not associated with another compound, such as for example in an AZS material, greater than 5%, or greater than 8% or greater than 10% or greater than 15% or greater than 18% but less than 30% or less than 25% or less than 22%; and/or a reactive alumina content greater than 1% or greater than 3% or greater than 5% or greater than 7% but less than 15% or less than 13% or less than 10%; and/or a fused-cast alumina content greater than 5% or greater than 8% or greater than 10% but less than 20% or less than 17% or less than 14%; and/or a silica fume content less than 6% or less than 5% or less than 4% but greater than 1% or greater than 2%; and/or a hydraulic cement content less than 10% or less than 7% or less than 6% but greater than 2% or greater than 4%.

Preferably, the AZS particles, the free zirconia particles, the free alumina particles, the silica fume and the cement particles together represent more than 95%, or even approximately 100%, of the mass of the combination of fractions (a) and (b).

Preferably, the powder includes between and 5% of silica fume.

Preferably, $Al_2O_3+ZrO_2+SiO_2 \geqq 97\%$.

Also preferably, the proportion of silica in the fraction of particles having a size less than 500 μm is less than or equal to 16% and/or the proportion of silica in the fraction of particles having a size of less than 40 μm is less than or equal to 14.5%, in percentages by weight relative to the weight of said fraction.

Preferably, the maximum size of the particles of a powder according to the invention is less than or equal to 10 mm, preferably less than or equal to 8 mm and preferably less than or equal to 5 mm.

Preferably, the fraction of particles of the powder having a size smaller than 500 μm represents more than 50% by weight of said powder.

Preferably, the fraction of particles of the powder having a size between 40 μm and 500 μm is between 15 and 30%, preferably greater than 17%, or greater than 18% but less than 28% or less than 25% or less than 22% relative to the weight of said powder.

The invention also relates to a fresh concrete obtained from a powder according to the invention.

In addition, the cured concrete obtained from this fresh concrete has a satisfactory dilatometric behaviour. It is therefore preferably able to be used for the production of floors of a glass furnace.

The invention also relates to a process for manufacturing a cured concrete, comprising the following successive steps:

1) preparation of a powder according to the invention;
2) activation of said powder so as to obtain a fresh concrete;
3) laying of said fresh concrete;
4) curing of said fresh concrete so as to obtain a cured concrete; and
5) sintering of said cured concrete.

Preferably, in step 1), raw materials containing more than 90% zirconia by weight and having a median size ($D_{50}$) of less than 10 μm, preferably less than 5 μm, such as the CC10 zirconias sold by the company Société Européenne des Produits Réfractaires, are used as zirconia sources in the fines.

Preferably, in step 2), said powder is activated by adding thereto an amount of water preferably greater than 4% or even greater than 5% or greater than 6% but less than 9% or less than 8% or less than 7%, preferably between 5.1 and 8.2%, by weight relative to the weight of said powder.

Advantageously, in step 3), the fresh concrete may be pumped by a pump producing a suction pressure of 180 bar or less.

Preferably, in step 3), the fresh concrete is transferred from the mixer at the pouring site via a chute in which it flows under gravity.

Preferably, the fresh concrete is poured and undergoes no vibration operation before it is cured.

Preferably, in step 5), the cured concrete is sintered at a temperature between 1000° C. and 1500° C., preferably in air and at atmospheric pressure. The sintering time is adapted according to the dimensions of the product to be sintered. The sintering hold time is generally between 1 and 20 hours, preferably between 5 and 10 hours. Under applications in which, in its service position, the cured concrete may be subjected to heating conditions liable to sinter it, the cured concrete is put into position without having been sintered, and then sintered in situ.

In step 3), the fresh concrete may be poured so that the cured concrete constitutes a floor of a glass furnace.

DEFINITIONS

The term "powder" is understood to mean a dry particle blend capable of setting solid after being activated.

The "size" of a particle is given conventionally by characterizing its particle size distribution. A laser particle size analyser is used for example to measure sizes of 5 mm or less.

What is called the "median size" of a particle assembly, noted by $D_{50}$, is the size that divides the particles of this assembly into first and second populations equal by weight, these first and second populations having only particles with a size greater than and less than the median size, respectively.

The activation is a solid-setting process. The activated state conventionally results from wetting a powder with water or another liquid. During this process, a wet powder is called "fresh concrete".

A solid mass obtained by the setting of a fresh concrete is called "cured concrete". A cured concrete is thus made up of an assembly of grains linked together by a matrix.

A hydraulic cement or "hydraulic binder" is a binder which, upon activation, causes hydraulic curing or setting at the ambient temperature.

The term "zirconia" denotes zirconium oxide $ZrO_2$. When reference is made to $ZrO_2$, it should be understood that this means ($ZrO_2+HfO_2$) since a small amount of $HfO_2$, chemically inseparable from $ZrO_2$ in a melting process and having similar properties, is always naturally present in zirconia sources with contents generally of less than 2%. Hafnium oxide is therefore not considered as an impurity.

The term "main constituents" is understood to mean the constituents having the highest proportions by weight.

All the percentages in the present description are percentages by weight, unless otherwise indicated.

DETAILED DESCRIPTION

Said particles (a) may consist of refractory materials having various chemical compositions. The particle size distributions of the particles may also differ according to their constituent material provided that, overall, the particle size constraints imposed by the invention are met.

The proportion of zirconia in the fines (a fraction of the powder consisting of particles having a size smaller than 10 μm) must however be between 40% and 75% by weight relative to the total weight of said fraction.

Without being tied to one theory, the inventors consider that the presence of zirconia in the fines, in the proportions indicated, makes it possible to lay the fresh concrete under its own weight, the zirconia fines making it easier for particles to move relative to one another, and prevents segregation.

Increasing the zirconia content in the fines results in a substantial increase in the release of stones above a zirconia content in the fines of about 65%. Below 55% zirconia in the fines, the release of stones becomes slight or even substantially zero. Preferably, the zirconia content in the fines is therefore between 40% and 65%, preferably between 40% and 55%.

Preferably, the powder has a composition, in percentages by weight and for a total of more than 95%; preferably for a total of more than 97%, such that:
$Al_2O_3$: 40-65%
$ZrO_2$: 20-45%
$SiO_2$: 8-20%.

Also preferably, the powder has a composition, in percentages by weight and for a total of more than 95%, preferably for a total of more than 97%, such that:
$Al_2O_3$: 45-65%, preferably 50-60%
$ZrO_2$: 25-40%, preferably 30-40%
$SiO_2$: 8-15%.

The powder may also have a composition, in percentages by weight and for a total of more than 95%, preferably for a total of more than 97%, such that:
$Al_2O_3$: 45-65%,
$ZrO_2$: 20-35%,
$SiO_2$: 12-20%.

To obtain particles (a), various refractory materials may be used, coming for example from:
  fused-cast refractory products such as ER-1681 or l'ER-1711 produced and sold by the company Société Européenne des Produits Réfractaires. These two products, called in Table 1 "AZS particles" (because of their $Al_2O_3$, $ZrO_2$ and $SiO_2$ contents), contain in percentages by weight, on the basis of the oxides: 32 to 54% $ZrO_2$, 36 to 51% $Al_2O_3$, 10 to 16% $SiO_2$ and 0.2 to 1.5% $Na_2O$;
  fused mullite refractory products, called "mullite" in Table 1, for example a powder containing 76.5% $Al_2O_3$ and 22.5% $SiO_2$, the particle size of which vary from 0.7 to 1.5 mm;
  products having a high zirconia content, which are called "zirconia" in Table 1, such as the zirconia CC10 sold by the company Société Européenne des Produits Réfractaires. This product contains more than 99% $ZrO_2$ and the median size ($D_{50}$) of the zirconia particles is 3.5 μm;
  reactive alumina, or a blend of reactive aluminas, containing more than 99% $Al_2O_3$, the median size of the reactive alumina particles possibly varying from 0.5 μm to 3 μm;
  fused-cast alumina, the particles of which have a size of between 0.04 and 0.5 mm; and
  silica, such as the silica fume sold by the company Société Européenne des Produits Réfractaires. This glassy silica contains more than 93% silica ($SiO_2$) and is in the form of a powder having particles of a size between 0.1 and 5 μm and a median size of 0.5 μm.

Advantageously, the presence of silica makes it possible to reduce the amount of water needed to make the fresh concrete pourable. It seems that the very fine silica particles are well distributed and then make it possible to obtain good bonding in the final product after sintering. For this reason, it is considered preferable to have a silica fume content in the powder of between 3% and 5%.

Preferably, the proportion of silica in the particle fraction having a size of less than 500 μm is less than or equal to 16%, preferably less than 14.5%, by weight relative to the weight of said fraction.

Preferably, the proportion of silica in the particle fraction having a size of less than 40 μm is less than or equal to 14.5% or even less than 11% by weight relative to the weight of said fraction.

The hydraulic cement, denoted by (b), constitutes 1% to 6% of the powder, preferably more than 3% but less than 5% by weight. The hydraulic cement (b) may be a high-alumina cement or a blend of various cements. To limit the lime (CaO) content, it is preferred to use a cement with a high alumina content such as the cement CA25 from the company Alcoa. The cement CA25 contains more than 78% $Al_2O_3$ and less than 19% CaO. The particles of the cement CA25 have a median size of about 8 μm.

Preferably, the alumina content of the hydraulic cement is greater than 60% by weight. Also preferably, the hydraulic cement contains, as main constituents, alumina and calcium aluminates.

The powder according to the invention may also contain organic fibres (c) in a proportion of 0 to 0.03%. These fibres are for example polypropylene, polyacrylonitrile or polyvinyl alcohol fibres, the average length of which varies between 18 and 24 mm.

The presence of organic fibres helps to improve the green strength of the cured concrete and prevents the formation of cracks as it is being dried. However, these fibres are not essential. Furthermore, the addition of fibres reduces the self-levelling property of the fresh concrete while a fibre content above 0.03% prevents the fresh concrete from being self-levelling.

Moreover, the organic fibres (c) are eliminated as the temperature of the furnace rises, thus creating a network of small channels enabling water to be eliminated more effectively.

Preferably, the powder according to the invention further includes at least one surfactant (d) in a proportion of 0.1% to 1%, preferably in an amount greater than 0.2% but less than 0.5% and more preferably less than 0.4%. The role of this surfactant is in particular to modify the rheological properties of the fresh concrete so as to make pumping easier. It is preferred to use surfactants of the modified polycarboxylate type, preferably of the modified polycarboxylate ether type and more preferably based on polyethylene glycol.

Preferably, the powder according to the invention also includes at least one setting accelerator (e), preferably in a proportion of 0.01 to 0.15%. Such setting accelerators are known per se by those skilled in the art.

The particle size distribution of the powder particles is such that:
  fraction<0.5 μm: ≧4%
  fraction<2 μm: ≧5%
  fraction<10 μm: ≧16%
  fraction<40 um: 29-45%.

It is clear that the particles having a size of less than 10 μm (which constitute the "<10 μm fraction") are compatabilized in the 29% to 45% of the particles having a size of less than 40 μm and that the particles having a size of less than 2 μm are compatabilized in the particles having a size of less than 40 μm and in those having a size of less than 10 μm, etc.

Preferably, the particles of the powder are distributed in the following manner:
  fraction<0.5 μm: ≧4%
  fraction<2 μm: ≧8%
  fraction<10 μm: ≧16%
  fraction<40 μm: 30-45%.

Also preferably, the particles of the powder are distributed in the following manner:
  fraction<0.5 μm: ≧5%
  fraction<2 μm: ≧10% fraction<10 µm: ≧22%
fraction<40 µm: 30-45%.

Again preferably, the particles of the powder are distributed in the following manner:
fraction<0.5 µm: ≧5%
fraction<2 µm: 10%-18%
fraction<10 µm: 22%-35%
fraction<40 µm: 30%-40%.

Again preferably, the particles of the powder are distributed in the following manner:
fraction<0.5 µm: 5%-6.5%
fraction<2 µm: 13%-18%
fraction<10 µm: 24%-34%
fraction<40 µm: 30%-40%.

A powder according to the invention may be packaged in bags or in drums. Preferably, the powder is ready to use, i.e. it incorporates all the constituents except for water.

To manufacture a fresh concrete from a powder of the invention, the various components are intimately mixed with an amount of water (f) varying between 5.1% and 8.2% by weight relative to the weight of said powder. The water content may be adjusted according to the concrete.

Advantageously, this fresh concrete may be conveyed directly into the glass furnace, for example to produce the floor underlayer, by flowing under gravity through a chute. It may also be pumped using a piston pump. It may therefore be processed by simply pouring it, with no vibration.

The cured concrete is then left to stand at ambient temperature. The rise in temperature of the furnace then causes the cured concrete to be sintered and results in a cured and sintered concrete according to the invention. A sintering temperature between 1000 and 1500° C. is very suitable. If the cured concrete is sintered in a furnace, the hold time may be between 1 and 20 hours, preferably between 5 and 10 hours.

Preferably, the sintering is carried out in situ.

The powder of the invention may also serve to manufacture shaped blocks of various sizes, particularly blocks intended to be assembled in a glass furnace.

EXAMPLES

The following non-limiting examples are given for the purpose of illustrating the invention.

The "self-levelling" character and the segregation are evaluated by the following test:
25 kg of fresh concrete are prepared in a mixer, with a mixing time of 17 minutes, and then poured into a pre-oiled hopper, in the form of a truncated pyramid, placed point down, and having a height of 320 mm, an opening of square cross section greater than 350 mm×350 mm and an outlet opening of square cross section of less than 130×130 mm initially closed by a trapdoor.

The trapdoor of the hopper is then briskly opened and the fresh concrete flows wider its own weight, through the outlet opening, into the top end (700 mm from the ground) of a straight semicircular PVC chute oiled beforehand, having a diameter of 170 mm and a length of 1600 mm, the bottom end of the chute being 380 mm from the ground.

The fresh concrete flows through the chute and is poured into a mould placed beneath the chute, below the bottom end of the chute. The mould is a wooden mould having dimensions of 300 mm×300 mm×60 mm, which is oiled and placed horizontally on the ground.

The fresh concrete is then left to stand until it has hardened in the form of a slab.

The thickness of the slab is measured on each of the four lateral faces of the slab, at both ends and at mid-length of each face.

The self-levelling character (or SL) is acquired if the top surface of the slab appears to be substantially smooth to the eye and if the difference E between the smallest measured thickness and the largest measured thickness is less than or equal to 2 mm on each of the four lateral faces.

After an oven treatment at 110° C. for 24 hours, the slab is sawn into two through its centre, thus exposing two sawn faces. Segregation results in the coarsest grains migrating away from the top face of the slab. Segregation is considered to be present when the sawn faces reveal a surface laitance layer extending from the top face of the slab over a depth e of 3 mm or more.

A specimen is taken from each of the refractory slabs in order to determine the dilatometric behaviour. Because of the $Al_2O_3$, $ZrO_2$ and $SiO_2$ contents, the materials of these refractory slabs belong to the AZS family. Consequently, when the specimens are heated to 1350° C., they expand to a maximum expansion temperature $Td_{max}$ and then retract. The temperature $Td_{max}$ and the expansion $\Delta L$ % are measured.

The expansion of a refractory material generates thermo-mechanical stresses that may cause cracks. It is therefore preferable for the maximum expansion temperature $Td_{max}$ to be close to the service temperature, generally between 1250° C. and 1300° C.

$\Delta L$ % is equal to the ratio of the difference in lengths of the specimen $L_{max}$ at $Td_{max}$ and $L_{1350}$ at 1350° C. respectively to the initial length L of the specimen (at the ambient temperature of about 20° C.), i.e. $\Delta L\% = (L_{max} - L_{1350})/L$, with L equal to 50 mm.

Table 1 provides the composition of the particle blends (a)+(b). It also indicates the particle size distribution of the AZS particles used. In particular, the columns under the "AZS particles (percentages by weight)" header correspond to the commercial sources used as raw materials and not to particle size distribution values actually measured. Thus, for example, the specimen "comp 1" is obtained from a starting charge formed, for 10%, from a commercial source of AZS particles, the technical data sheet for which or their packaging indicate "40-500 µm". However, all the particles of this commercial source of AZS particles do not have strictly a size between 40 and 500 µm. The measured particle size values are given in Table 2.

Table 2 gives the compositions of the fresh concrete tested. The $Al_2O_3$, $ZrO_2$ and $SiO_2$ contents of the concrete obtained from the fresh concretes are substantially identical to those of the powders used.

In Table 2, the surfactant A is a long-chain sodium polyphosphate and the surfactants B and C are compounds of the family of modified polycarboxylate ethers. The choice of a surfactant from the surfactants generally used by those skilled in the art will be guided by the results of simple tests, such as those described in the present application, according to the desired performance (density of the cured concrete obtained, dilatometric properties of the cured concrete obtained).

In Table 2, the "$ZrO_2$: 0-10 µm" column shows the proportion of zirconia in the fraction of particles having a size of less than 10 µm, in wt % relative to the total weight of said fraction.

TABLE 1

Composition of (a) + (b) in percentages by weight

| Expl. | AZS particles (percentages by weight) | | | | Mullite | Zirconia | Reactive alumina | Fused-cast alumina | Silica fume | Cement |
|---|---|---|---|---|---|---|---|---|---|---|
| | 2-5 mm | 0.5-2 mm | 40-500 μm | 0-40 μm | | | | | | |
| Comp 1 | 21 | 18 | 10 | 8 | 8 | 4 | 11 | 12 | 3 | 5 |
| Comp 2 | 21 | 18 | 10 | 8 | 8 | 4 | 11 | 12 | 3 | 5 |
| Comp 3 | 21 | 18 | 10 | 8 | 8 | 4 | 11 | 12 | 3 | 5 |
| Comp 4 | 20 | 23 | 19 | | 12 | 8 | 11 | | 3 | 4 |
| Comp 5 | 20 | 23 | 19 | | 12 | 8 | 11 | | 3 | 4 |
| Comp 6 | 20 | 20 | 21 | | 8 | 7 | 17 | | 3 | 4 |
| 1 | 21 | 18 | 10 | 3 | 8 | 13 | 7 | 12 | 3 | 5 |
| 2 | 21 | 26 | 10 | | | 15 | 8 | 12 | 3 | 5 |
| 3 | 21 | 26 | 10 | | | 15 | 8 | 12 | 3 | 5 |
| 4 | 21 | 26 | 10 | | | 15 | 8 | 12 | 3 | 5 |
| 5 | 21 | 26 | 10 | | | 15 | 8 | 12 | 3 | 5 |
| 6 | 21 | 26 | 10 | | | 15 | 8 | 12 | 3 | 5 |
| 7 | 21 | 26 | 10 | | | 15 | 8 | 12 | 3 | 5 |
| 8 | 21 | 26 | 10 | | | 12 | 11 | 12 | 3 | 5 |
| 9 | 19 | 24 | 9 | | | 18 | 11 | 11 | 3 | 5 |
| 10 | 21 | 26 | 12 | | | 15 | 6 | 12 | 3 | 5 |
| 11 | 21 | 26 | 12 | | | 18 | 3 | 12 | 3 | 5 |
| 12 | 19 | 24 | 9 | | | 26 | 3 | 11 | 3 | 5 |

TABLE 2

Composition of the fresh concrete

| Expl. | Contents in wt % (on the basis of the powder) (balance to 100%: CaO + impurities) | | | Organic fibres (c) | Surfactant (d) | Add. Water (%) (f) | (a) + (b) particles passing through | | | | |
|---|---|---|---|---|---|---|---|---|---|---|---|
| | $Al_2O_3$ | $ZrO_2$ | $SiO_2$ | | | | 0.5 μm | 2 μm | 10 μm | 40 μm | 500 μm |
| Comp 1 | 62.1 | 22.8 | 13.4 | 0.02% | 0.3% of B | 5.2 | 5.3 | 12.3 | 23.9 | 32.8 | 52.9 |
| Comp 2 | 62.1 | 22.8 | 13.4 | 0.00% | 0.3% of B | 5.7 | 5.3 | 12.3 | 23.9 | 32.8 | 52.9 |
| Comp 3 | 62.1 | 22.8 | 13.4 | 0.00% | 0.5% of C | 5.7 | 5.3 | 12.3 | 23.9 | 32.8 | 52.9 |
| Comp 4 | 54.9 | 28.5 | 15.1 | 0.02% | 0.075% of A | 5.1 | 5.1 | 10 | 23.3 | 29.1 | 31.9 |
| Comp 5 | 54.9 | 28.5 | 15.1 | 0.00% | 0.3% of B | 6 | 6.9 | 10 | 23.3 | 29.1 | 31.9 |
| Comp 6 | 57.4 | 27.1 | 14 | 0.00% | 0.3% of B | 6 | 5.4 | 15.5 | 28.2 | 34.5 | 54 |
| 1 | 56 | 29.7 | 12.7 | 0.00% | 0.3% of B | 6.1 | 5.3 | 13.9 | 25.8 | 32.8 | 52.9 |
| 2 | 53 | 33.3 | 11.2 | 0.00% | 0.3% of B | 6.2 | 5.3 | 14.3 | 27.1 | 33.2 | 53.7 |
| 3 | 53 | 33.3 | 11.2 | 0.02% | 0.3% of B | 6.2 | 5.3 | 14.3 | 27.1 | 33.2 | 53.7 |
| 4 | 53 | 33.3 | 11.2 | 0.03% | 0.3% of B | 6.2 | 5.3 | 14.3 | 27.1 | 33.2 | 53.7 |
| 5 | 53 | 33.3 | 11.2 | 0.04% | 0.3% of B | 6.2 | 5.3 | 14.3 | 27.1 | 33.2 | 53.7 |
| 6 | 53 | 33.3 | 11.2 | 0.08% | 0.3% of B | 6.2 | 5.3 | 14.3 | 27.1 | 33.2 | 53.7 |
| 7 | 53 | 33.3 | 11.2 | 0.02% | 0.5% of C | 6.2 | 5.3 | 14.3 | 27.1 | 33.2 | 53.7 |
| 8 | 56.5 | 30.5 | 11.6 | 0.00% | 0.3% of B | 6 | 6.1 | 14.6 | 27.1 | 33.2 | 53.7 |
| 9 | 52.9 | 34.5 | 10.9 | 0.00% | 0.3% of B | 7.1 | 6.2 | 16.8 | 32.8 | 38.9 | 57.7 |
| 10 | 52.2 | 34 | 12 | 0.00% | 0.3% of B | 6.3 | 4.8 | 13.3 | 25.3 | 31.6 | 53.7 |
| 11 | 49.3 | 36.9 | 11.9 | 0.00% | 0.3% of B | 6.4 | 4 | 13 | 25.3 | 31.6 | 53.7 |
| 12 | 44.5 | 42.3 | 10.9 | 0.00% | 0.3% of B | 8.1 | 4.2 | 16 | 32.9 | 38.9 | 57.7 |

| Expl. | % of particles Between 40 and 500 μm | $SiO_2$ * (%) 0-500 μm | $SiO_2$ * (%) 0-40 μm | $ZrO_2$ (%) 0-10 μm | E (mm) | SL? | e (mm) | segregation? | $Td_{max}$ | ΔL % |
|---|---|---|---|---|---|---|---|---|---|---|
| Comp 1 | 20.1 | 10.9 | 13.5 | 21.5 | 7 | no | 0 | no | 1136 | 0.4 |
| Comp 2 | 20.1 | 10.9 | 13.5 | 21.5 | 1 | yes | 4 | yes | | |
| Comp 3 | 20.1 | 10.9 | 13.5 | 21.5 | 2 | yes | 4 | yes | | |
| Comp 4 | 2.8 | 13.1 | 11.5 | 32.9 | 8 | no | 0 | no | 1100 | 0.36 |
| Comp 5 | 2.8 | 13.1 | 11.5 | 32.9 | 3 | no | 3 | no | | |
| Comp 6 | 19.5 | 10.1 | 11.8 | 23.9 | 1 | yes | 4 | yes | | |
| 1 | 20.1 | 9.9 | 10.9 | 49 | 1 | yes | 0 | no | | |
| 2 | 20.5 | 9.1 | 9.7 | 51.7 | 0 | yes | 0 | no | 1150 | 0.21 |
| 3 | 20.5 | 9.1 | 9.7 | 51.7 | 1 | yes | 0 | no | | |
| 4 | 20.5 | 9.1 | 9.7 | 51.7 | 1 | yes | 0 | no | | |
| 5 | 20.5 | 9.1 | 9.7 | 51.7 | 3 | no | 0 | no | | |

TABLE 2-continued

| 6 | 20.5 | 9.1 | 9.7 | 51.7 | 5 | no | 0 | no |
|---|------|-----|------|-------|---|-----|---|-----|
| 7 | 20.5 | 9.1 | 9.7 | 51.7 | 1 | yes | 0 | no |
| 8 | 20.5 | 9.1 | 9.6 | 41.5 | 0 | yes | 0 | no |
| 9 | 18.8 | 8.2 | 8.3 | 51.4 | 1 | yes | 1 | no |
| 10 | 22.1 | 9.7 | 10.3 | 55.6 | 2 | yes | 2 | no |
| 11 | 22.1 | 9.7 | 10.4 | 66.5 | 1 | yes | 1 | no |
| 12 | 18.8 | 8.3 | 8.4 | 73.85 | 2 | yes | 1 | no |

*: the amount of silica in the particle size fraction in question;
The addition of water (f) is given as a percentage by weight on the basis of the powder.

The results allow the following observations to be made:

Example "Comp 1"; according to the teaching of FR 2 832 403, has no self-levelling character without segregation;

a comparison between Examples "Comp 1" and "Comp 2" shows that increasing the water content (from 5.2% to 5.7%) and omitting the fibres is not sufficient to give the fresh concrete a self-levelling character without segregation. The "Comp 2" fresh concrete is self-levelling but undergoes segregation. The increase in water content may lead to a deterioration in the properties of the cured concrete;

a comparison between Examples "Comp 1", "Comp 2" and "Comp 3" shows that changing the surfactant (C instead of B) does not give the fresh concrete a self-levelling character without segregation (which is that of Examples Comp 1 and Comp 2);

Example "Comp 4" shows that a zirconia content in the fines of 32.9% is not sufficient to give a self-levelling character;

Example "Comp 5" shows that modifying the surfactant and the water content does not necessarily make the fresh concrete self levelling. In addition, it has been found that if the water content is further increased, it is possible to obtain the self-levelling character but at the expense of segregation;

the fresh concrete of Example "Comp 6" is self-levelling, but undergoes segregation;

Example 1 has a particle size distribution very close to that of Example "Comp 1", but with a 49% zirconia content in the fines (as opposed to 21.5% in the case of "Comp 1") thanks to a further addition of zirconia fines (4% to 13% increase). Example 1 advantageously has a self-levelling character without segregation. Examples 2 to 7 have compositions similar to those of Example 1;

Examples 2, 3 and 4 show that a fibre content up to 0.03% does not degrade the self-levelling character. However, Examples 5 and 6 show that 0.05% and 0.08% fibre contents suppress the self-levelling character;

Example 7 shows that the self-levelling character is not lost when a different surfactant (type C) is used;

Example 8 has a 41.5% zirconia content in the fines. Comparing Examples "Comp 4" and "Comp 5" indicates that a zirconia content in the fines of at least 40% is necessary for obtaining the self-levelling character with no segregation;

Examples 9 to 12 make it possible to determine the maximum zirconia content in the fines fraction for maintaining the self-levelling character without segregation. Example 12 shows in particular that it is possible to introduce up to 73.8% zirconia in the fines fraction. Higher zirconia contents in the fines significantly degrade the stone release behaviour, and the powders of Examples 2 to 7 are preferred, among all these the powder of Example 3 (0.02% fibre content) being the most preferred.

As will now be clearly apparent, the invention provides a powder for manufacturing a fresh concrete which is "self-levelling", i.e. can be laid without a vibration operation, and which does not lead to segregation.

In addition, this fresh concrete can be pumped with suction pressures of 180 bar or less.

A fresh concrete according to the invention therefore makes it possible to manufacture, without a vibration operation, a cured concrete, and in particular a floor, especially for a glass furnace in which the cured concrete comes into contact with molten glass. Despite there being no vibration operation, the in-service behaviour of this cured concrete is excellent.

Of course, the present invention is not limited to the embodiments that have been described, these being provided merely as non-limiting illustrative examples.

The invention claimed is:

1. A powder comprising, in percentages by weight:
   (a) 94% to 99% of particles of at least one refractory material, a main constituent or constituents of which are alumina and/or zirconia and/or silica, the refractory material comprising zirconia;
   (b) 1% to 6% of a hydraulic cement; and
   (c) 0.03% at most of organic fibers,
   a fraction of particles having a size below 40 µm being distributed, in percentages by weight relative to the weight of the powder, in the following manner:
   fraction<0.5 µm: $\geqq 4\%$
   fraction<2 µm: $\geqq 5\%$,
   fraction<10 µm: $\geqq 16\%$
   fraction<40 µm: 29-45%,
   and the proportion of zirconia in the fraction of particles having a size smaller than 10 µm, called "fines", being between 40% and 75% by weight relative to the total weight of said fraction.

2. The powder according to claim 1, further comprising 0.075% to 1% of a surfactant and/or further comprising a setting accelerator.

3. The powder according to claim 1, wherein the proportion of zirconia in the fines fraction is greater than 40% but less than 60%.

4. The powder according to claim 1, wherein the particles of the powder are distributed in the following manner, in percentages by weight:
   fraction<0.5 µm: $\geqq 5\%$
   fraction<2 µm: $\geqq 8\%$ and/or
   fraction<10 µm: $\geqq 22\%$ and/or
   fraction<40 µm: $\geqq 30\%$.

5. The powder according to claim 1, wherein the particles of the powder are distributed in the following manner, in percentages by weight:
   fraction<0.5 µm: $\leqq 6.5\%$
   fraction<2 µm: $\geqq 10\%$ and/or
   fraction<10 µm: $\leqq 35\%$ and/or
   fraction<40 µm: $\leqq 40\%$.

6. The powder according to claim 1, wherein the particles of the powder are distributed in the following manner, in percentages by weight:
fraction<2 μm: ≧13%
fraction<10 μm: 24%-34%.

7. The powder according to claim 1, wherein the particles of the powder are distributed in the following manner, in percentages by weight:
fraction<2 μm: ≦18%.

8. The powder according to claim 1, which has the following composition by weight, for a total of more than 95%:
$Al_2O_3$: 40%-65%
$ZrO_2$: 20%-45%
$SiO_2$: 8%-20%.

9. The powder according to claim 1, which has a composition by weight such that:
$Al_2O_3$: ≧45% and/or
$ZrO_2$: ≧25% and/or
$SiO_2$: ≦15%.

10. The powder according to claim 1, which has a composition by weight such that:
$Al_2O_3$: ≦60% and/or
$ZrO_2$: ≦40% and/or
$SiO_2$: ≧12%.

11. The powder according to claim 1, which has a composition by weight such that:
$Al_2O_3$: ≧50% and/or
$ZrO_2$: ≧30%.

12. The powder according to claim 8, wherein $Al_2O_3 + ZrO_2 + SiO_2 ≧ 97\%$.

13. The powder according to claim 1, comprising between 3% and 5% of silica fume, as percentages by weight relative to the mass of the fractions (a) and (b).

14. The powder according to claim 1, wherein the proportion of silica in a fraction of particles having a size of less than 500 μm is less than or equal to 16% by weight relative to the weight of said fraction.

15. The powder according to claim 1, wherein the proportion of silica in the fraction of particles having a size of less than 40 μm is less than or equal to 14.5% by weight relative to the weight of said fraction.

16. The powder according to claim 1, wherein the hydraulic cement (b) constitutes 3% to 5% of the powder by weight.

17. The powder according to claim 1, wherein a fraction of particles having a size of less than 500 μm represents more than 50% by weight of said powder.

18. The powder according to claim 1, wherein the fraction of particles having a size of between 40 μm and 500 μm is between 15 and 30% relative to the weight of said powder.

19. A process for manufacturing a cured and sintered concrete, comprising the following successive steps:
1) preparing a powder;
2) activating said powder so as to obtain a fresh concrete;
3) laying said fresh concrete;
4) curing said fresh concrete so as to obtain a cured concrete; and
5) sintering said cured concrete,
wherein
in step 1), the powder is in accordance with claim 1, and
in step 3), the fresh concrete is poured and undergoes no vibration operation before it is cured.

20. The process according to claim 19, wherein in step 1), raw materials containing more than 90% zirconia by weight and having a median size $D_{50}$ of less than 10 μm are used as a zirconia source in the fines.

21. The process according to claim 19, wherein
in step 2), said powder is activated by adding thereto an amount of water of between 5.1 and 8.2% by weight relative to the weight of said powder.

22. The process according to claim 19, wherein
in step 3), the fresh concrete is pumped by means of a pump producing a suction pressure of 180 bar or less and/or conveyed to the pouring site by flowing under gravity in a chute.

23. The process according to claim 19, wherein
in step 3), the fresh concrete is poured so that said cured and sintered concrete constitutes a floor of a glass furnace.

24. The powder according to claim 1, further comprising 0.075% to 1% of a surfactant by weight.

25. The powder according to claim 1, further comprising a setting accelerator.

26. The powder according to claim 24, wherein the surfactant is a modified polycarboxylate ether.

* * * * *